United States Patent [19]
Temby

[11] Patent Number: 5,279,257
[45] Date of Patent: Jan. 18, 1994

[54] PET WASHING AND GROOMING APPARATUS

[76] Inventor: Paul R. Temby, 3536 28th St., San Diego, Calif. 92104-4103

[21] Appl. No.: 33,206

[22] Filed: Mar. 16, 1993

[51] Int. Cl.⁵ ............................................. A01K 13/00
[52] U.S. Cl. .................................................. 119/158
[58] Field of Search .................. 119/158, 159, 160, 19

[56] References Cited

U.S. PATENT DOCUMENTS

| | | | |
|---|---|---|---|
| 1,760,017 | 5/1930 | Smoot | 119/1 |
| 2,536,943 | 1/1951 | Kessel | 119/1 |
| 3,150,641 | 9/1964 | Kesh | 119/160 |
| 3,263,653 | 8/1966 | Miller | 119/158 |
| 3,596,636 | 8/1971 | Stobaugh | 119/1 |
| 3,749,064 | 7/1973 | Weinstein et al. | 119/158 |
| 4,020,796 | 5/1977 | Grifa | 119/158 |
| 4,057,032 | 11/1977 | Dimitriadis | 119/1 |
| 4,083,328 | 4/1978 | Baker | 119/158 |
| 4,316,433 | 2/1982 | Hebert | 119/158 |
| 4,407,234 | 10/1983 | Kleman | 119/158 |
| 4,782,792 | 11/1988 | Anthony et al. | 119/158 |
| 4,836,144 | 1/1989 | Cole | 119/158 |
| 4,987,860 | 1/1991 | Davis | 119/158 |

Primary Examiner—Gene Mancene
Assistant Examiner—Thomas Price

[57] ABSTRACT

A portable and economical pet washing and grooming apparatus which maintains grooming or washing fluids within apparatus from leaking or escaping beyond apparatus confines and allows user to stay dry while washing or grooming pet. The apparatus has a flexible transparent upper casing (30) permanently bonded to a rigid tub(32). The upper casing (30) has a dorsal aperture (35) for entry of an animal into apparatus, a head opening (70) through which the head of the animal can extend, and slide fastener sections (36) and slider (38) for opening and closing dorsal aperture (35) and head opening (70). The upper casing (30) has a pair of spaced holes (42) formed therethrough and a pair of cuffs (43) extending therefrom; one cuff (43) at each corresponding hole (42).

14 Claims, 4 Drawing Sheets

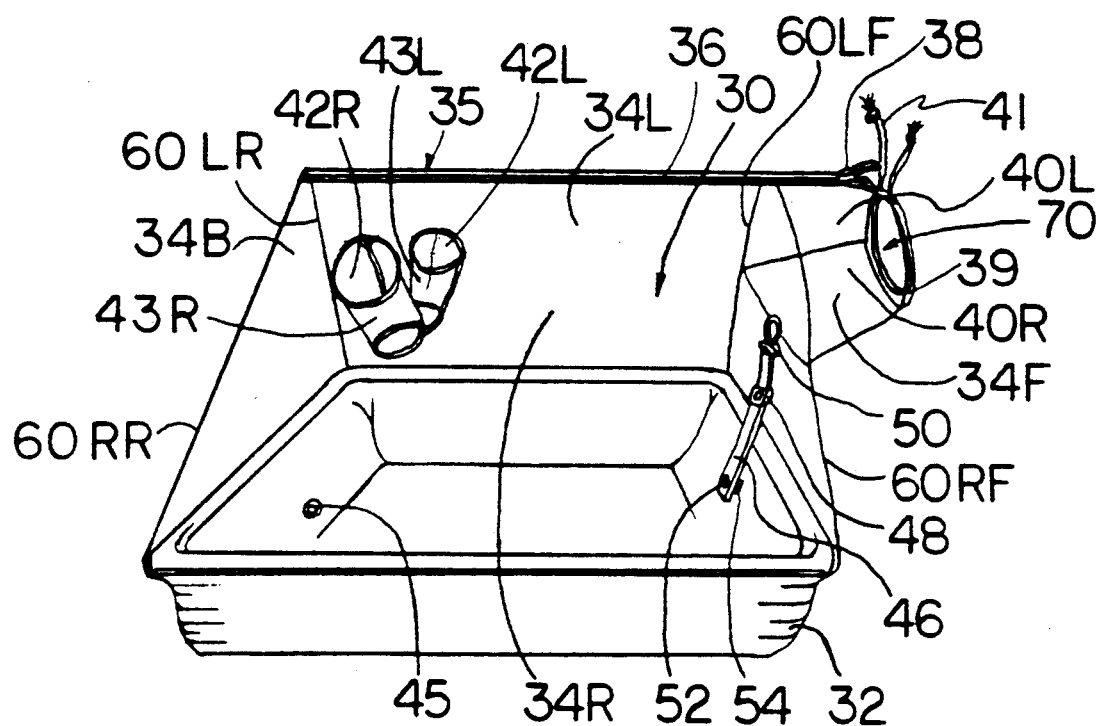
FIG. 1
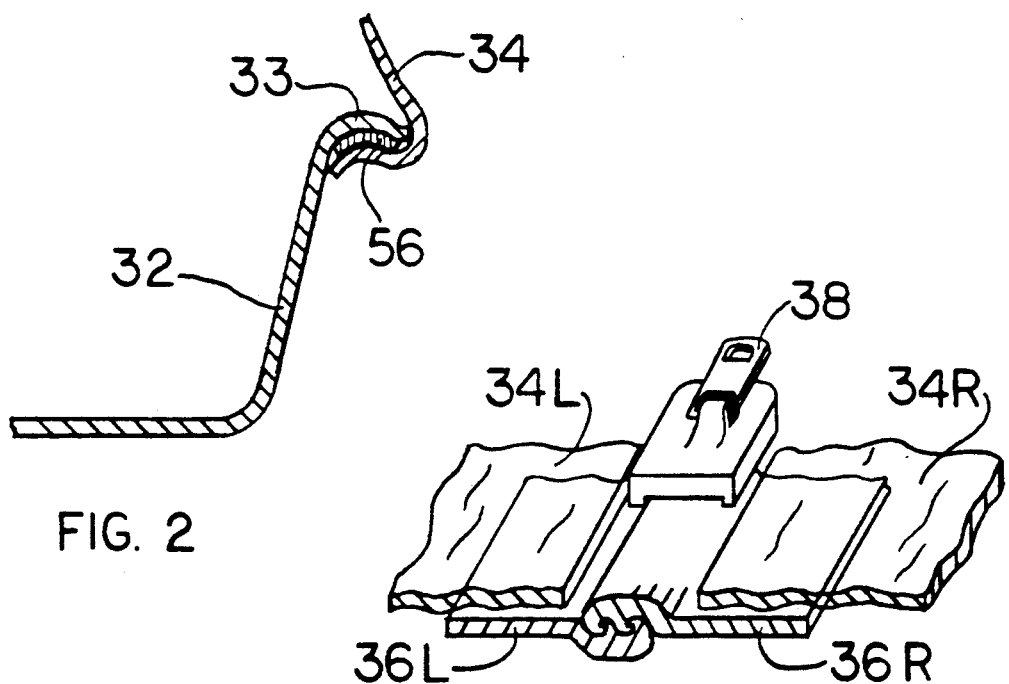
FIG. 2
FIG. 3

PET WASHING AND GROOMING APPARATUS

BACKGROUND OF THE INVENTION

This invention pertains to the animal husbandry arts and particularly to equipment and accessories used for bathing and grooming domestic pets.

DISCUSSION OF PRIOR ART

One of the responsibilities of caring for a pet is the routine washing and grooming of the animal. Many pet owners select to do these hygenic duties themselves while others take their animals to professional groomers at some expense. Traditionally, washing by pet owners involved using the bath tub inside the domicile, using an open wash tub outside the residence or simply washing the animal in an open space. The difficulties in these methods included washing fluids splattering uncontrollably, animal hairs plugging tub drains, an inability to restrain the animal, mess from the soiled water and fluids used in the washing process, an inability to control where these solutions were drained, an excessive use of water, liquids entering the animal's ears and eyes, etc. In addition, pet owners had difficulty using measure and mix anti-pest grooming products, such as flea dips, because they lacked a convenient container in which to mix these products as well as a location or apparatus to let the product soak on the animal while keeping the animal restrained and relatively warm.

In the past, various types of apparatuses have been developed to address these various problems. The Animal Washing Stand in U.S. Pat. No. 4,316,433 to Herbert, Feb. 23, 1982, provides a method of restraining the pet while washing but does not differ much from the traditional method of washing and grooming.

The portable pet washing device in U.S. Pat. No. 4,083,328 to Baker, Apr. 11, 1978, attempts to solve some of the traditional problems of washing and grooming a pet. Although the device may be able to restrain the pet through effects of the bag around the animal's neck, the apparatus lacks a dedicated means of securing or restraining the animal, such as a restraining strap or harness. This lack of a dedicated restraining means may result in the animal stretching or tearing the head opening by excessive use of force when struggling. In addition, the animal's freedom could hamper the grooming process. While trying to struggle free the animal could press its body against the bag, thus hindering the user's access to the animal. A restraining strap would limit the mobility of the animal and eliminate the possibility of stretching and tearing the head opening. In addition to the above noted deficiency, the fastening means for releasably affixing the device's clear bag to the tub could allow fluid leakage. The soiled washing or grooming fluids contained in the apparatus could leak onto the immediate area where the apparatus was being used and cause problems similar to those encountered using the old traditional washing or grooming methods. In addition, the numerous fastening devices which pivot to release clear bag from tub result in manufacturing expenses which must be passed on to consumers. These expenses include manufacturing pivot fastening devices, attaching all of them to the apparatus, and manufacturing a bag with slots or holes appropriately positioned to fit over the pivot fasteners. By affixing the bag permanently to the tub using fluid impermeable fastening methods including; tapes, adhesives, thermal bonding, or various simple mechanical fasteners, manufacturing costs could be eliminated.

The apparatus for Bathing Dogs in U.S. Pat. No. 3,749,064 to Weinstein, et. al., Jul. 31, 1973, also attempts to solve the traditional washing and grooming problems, however, the apparatus does not provide a location for mixing anti-pest grooming solutions, and does not provide a means for containing washing or grooming fluids. As such, the apparatus does not provide a means for conserving water or catching and containing anti-pest fluids which can be applied to the animal repeatedly to soak the animal's skin and hair. Furthermore, as the soiled washing fluid drains in the immediate location where the washing takes place, the problem of soiled fluid discharge is not solved. This results in the possibility of animal hairs plugging bath tub drains, open areas becoming wet where the apparatus is used, etc. In addition, the apparatus does not provide a convenient means for entering grooming products or tools into the device once the dorsal aperture is closed. If the user forgets to place a needed grooming product into the apparatus after closing the apparatus dorsal aperture, he must remove hands from gloves, open dorsal aperture, place grooming product inside apparatus, close dorsal aperture and reinsert hands into gloves.

The Method and Apparatus for Washing and Treating Animals with a Recirculating Fluid System in U.S. Pat. No. 4,836,144 to Cole, Jun. 6, 1989, does provide a method of conserving water during washing as well as provide a means of restraining pet. However, the invention is not portable, it is not comparatively inexpensive to manufacture and its does not provide a means of keeping the animal from becoming cold during grooming.

Further examples of prior art animal bathing apparatuses may be seen generally in U.S. Pat Nos. 4,987,860; 4,407,234; 4,057,032; 3,596,636; 2,536,943; 1,760,017.

OBJECTS AND ADVANTAGES

Objects of the invention are to provide a portable and economical pet grooming apparatus, which allows the user to remain dry while bathing or grooming his pet and which confines grooming fluids within its confines, thereby enabling a conservation of water during the bathing or grooming process. The apparatus provides a very simple and inexpensive improvement to traditional methods of grooming or washing a pet. Furthermore, the enclosure and tub allow the use of warm water during bathing and provide a convenient receptacle for mixing anti-pest solutions and other measure and mix grooming products. The enclosure also provides a barrier to cold air and wind which could otherwise chill the pet while wet. Similarly, the enclosure provides a shield to contain the animal's natural body heat, thereby increasing the pet's general comfort level during bathing. The adjustable restraining strap provides a simple means of restraining the animal. As such, the apparatus provides a means for comfortably immobilizing the pet while providing a location for allowing solutions to remain on the animal's skin and soak for a period of time as would be required when applying anti-pest solutions. The adjustable restraining strap allows the pet to either sit or stand at will. The enclosure's head opening adjustment feature provides a means for adjustable cinching the enclosure neck portion around the animal's neck. This feature allows the animal's head to protrude to the exterior of the enclosure, while maintaining a water tight seal around the pet's neck thereby eliminating the possiblity of the grooming fluid or soapy solution from getting in the animal's eyes or ears. The enclosure's fluid impermeable slide fastener allows easy entry and exit of the pet. The clear enclosure panels allow easy viewing of the animal during the grooming or washing process. The enclosure tub provides a rigid support for the animal's weight as well as a sturdy surface for the animal to stand or sit on. The enclosure arm holes and cuffs allow easy entry and removal of grooming products and tools even after the animal is in the enclosure and the apparatus dorsal aperture is closed. In addition, the arm holes and cuffs allow the user complete access to the animal during grooming or washing. The enclosure drain and drain plug provide a means of controlling the soiled grooming solution discharge. This provides the user with the ability to select the location for the waste fluid disposal. Still further objects and advantages will become apparent from a consideration of the ensuing description and drawings.

DESCRIPTION OF THE DRAWINGS

In the appended drawings, which form a part of the specification and which are to be construed in conjunction therewith, and in which like reference numerals have been employed throughout to indicate like parts in the various views;

FIG. 1 shows a perspective view of a pet washing and grooming apparatus embodying this invention;

FIG. 2 shows a partial sectional view of an adhesive tape used to join a panel to a tub;

FIG. 3 shows a perspective, sectional view of a slide fastener with a slider;

REFERENCE NUMERALS IN DRAWINGS

Figure 4:
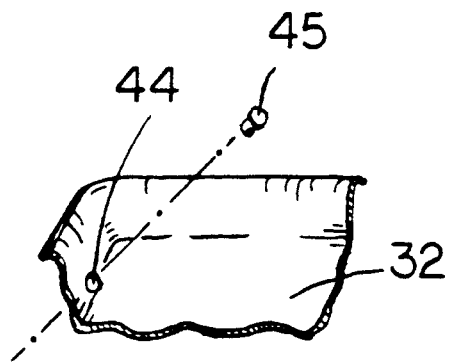
FIG. 4 shows a partial perspective view of a drain hole in a tub and a drain plug.

30 Upper Casing
32 Tub
33 Tub Lip
34 Panel
35 Dorsal Aperture
36 Slide Fastener Section
38 Slider
39 Neck Piece Hem
40 Neck Piece
41 Neck Piece Adjustment Chord
42 Hole
43 Cuff
44 Drain Hole
45 Drain Plug
46 Restraining Strap
48 Adjustment Buckle
50 Snap Lock
52 Screw
54 Nut
56 Double Sided Adhesive Tape
60 Seam
70 Head Opening
80 Cuff Elastic Gather
82 Cuff Hem
90 Rivet
93 Panel Hole
95 Tub Strip Hole
96 Strip Plate
97 Strip Plate Hole
98 Adhesive
100 Head Opening Elastic Gather
110 Fluid Source Entry Hole
112 Fluid Source Entry Sleeve
120 Hook and Loop Fastener Hook Section
122 Hook and Loop Fastener Loop Section
124 Female Snap
126 Male Snap
130 Wire Base Frame
131 Base Frame Gusset Tab
132 Bottom

SUMMARY OF INVENTION

A portable and economical pet washing and fluid application apparatus which allows the user to stay dry and which maintains grooming or washing fluids within enclosure from leaking or escaping beyond enclosure's confines. Apparatus allows conservation of water or fluids and provides means for discarding soiled grooming solution in desired fluid disposal location. The invention provides means of restraining animal and allows animal to sit or stand while restrained. Enclosure provides shelter for animal from cold air and helps contain animal's body heat during use. Adjustable head opening of apparatus allows animal's head to be isolated from fluids within enclosure, substantially eliminating the possibility of fluids entering animal's eyes or ears. Apparatus provides means for soaking animal in pest control products, such as flea and tick dips, etc. Clear enclosure panels allow viewing of animal during grooming.

DESCRIPTION OF THE INVENTION

A typical embodiment of the present invention is illustrated in FIG. 1. The enclosure has a tub 32 of fluid-impermeable material. In the preferred embodiment, the tub is a plastic, such as polyethylene. However, the tub can consist of any other material that is fluid-impermeable, such as polypropylene, vinyl, nylon, rubber, various impregnated or laminated materials, various plasticized materials, etc.

A right side panel 34R, a left side panel 34L, a front panel 34F, and a back panel 34B are joined to tub 32, (FIG. Right side panel 34R, left side panel 34L, front panel F, and back panel 34B consist of thin, flexible, fluid-impermeable material. In the preferred embodiment, panels are clear double-polished plasticized vinyl. However, panels can consist of any other material that is substantially fluid-impermeable, such as polyethylene, rubber, polypropylene, nylon, treated cloth, etc. Right side panel 34R, left side panel 34L, front panel 34F and back panel 34B are bonded to tub 32 along a tub lip 33 by virtue of a double sided adhesive tape 56. FIG. 2 shows double sided adhesive tape 56 laminated between tub lip 33 and panel 34.

The enclosure has an upper casing generally indicated at 30, including panels 34, neck pieces 40, slide fastener sections 36 and a slider 38. Right side panel 34R is thermally bonded to front panel 34F forming a fluid-impermeable right front seam 60RF. Right side panel 34R is thermally bonded to back panel 34B forming a fluid-impermeable right rear seam 60RR. Left side panel 34L is thermally bonded to front panel 34F forming a fluid-impermeable left front seam 60LF. Left side panel 34L is thermally bonded to back panel 34B forming a fluid-impermeable left rear seam 60LR. In the preferred embodiment, panels 34 are thermally bonded to each other. However, bonding of panels may be accomplished by means of liquid adhesives, double sided adhesive tapes, R. F. welding, sewing, etc.

FIG. 3 shows a dorsal aperture closure means comprising a slide fastener right section 36R, a slide fastener left section 36L and a slide fastener closure device or slider 38. Slide fastener right section 36R is thermally bonded to right side panel 34R forming a fluid-impermeable seam. Slide fastener left section 36L is thermally bonded to left side panel 34L forming a fluid-impermeable seam. Slide fastener right section 36R is thermally bonded to back panel 34B forming a fluid-impermeable seam. Slide fastener left section 36L is thermally bonded to back panel 34B forming a fluid-impermeable seam. Slider 38 is positioned coincidentally on slide fastener right section 36R and slide fastener left section 36L, (FIG. 3). In the preferred embodiment, slider 38 is a steel alloy. However, slider 38 can consist of any other rigid material that is corrosion resistant, such as various metals, nylon and other various plastics.

In FIG. 1 a right side neck piece 40R is thermally bonded along its rear edge to right side panel 34R forming the upper portion of fluid-impermeable right front seam 60RF. Right side neck piece 40R is thermally bonded along lower edge to front panel 34F forming a fluid-impermeable seam. Right side neck piece 40R is thermally bonded to slide fastener right section 36R forming a fluid-impermeable seam. A left side neck piece 40L is thermally bonded along its rear edge to left side panel 34L forming the upper portion of fluid-impermeable left front seam 60LF. Left side neck piece 40L is thermally bonded along lower edge to front panel 34F forming a fluid-impermeable seam. Left side neck piece 40L is thermally bonded to slide fastener left section 36L forming a fluid-impermeable seam. In FIG. 1 a dorsal aperture is generally indicated at 35 and a head opening is generally indicatd at 70. In the preferred embodiment right side neck piece 40R and left side neck piece 40L are made of double polished clear plasticized vinyl. However, other thin, flexible, fluid-impermeable materials, such as polyethylene, etc., could be used.

Figure 7:
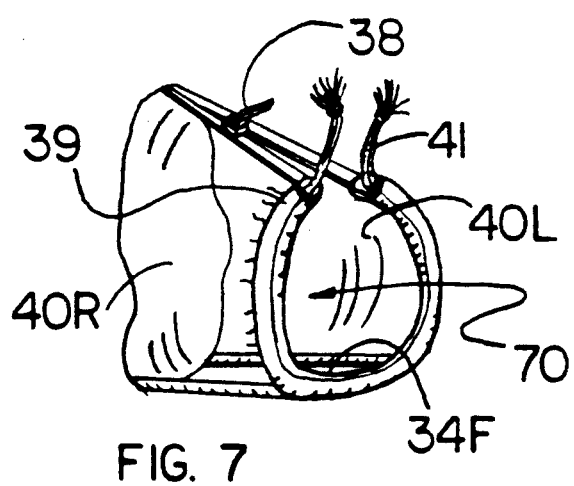
FIG. 7 shows a partial perspective view of a head opening with a neck piece adjustment chord.

A neck piece hem 39 is formed by doubling over the front edge of head opening 70, (FIG. 7). A neck piece adjustment chord 41 passes through neck piece hem 39. In the preferrred embodiment, neck piece adjustment chord 41 consists of polyester material. However, the neck piece adjustment chord 41 can consist of nylon, cotton, polypropylene, or any other flexible chord material.

Figure 6:
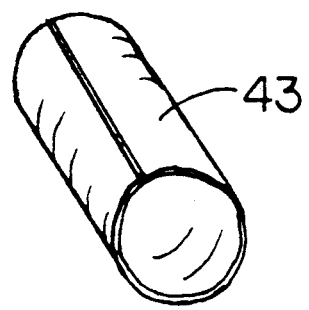
FIG. 6 shows a perspective view of a cuff.

FIG. 6 shows a cylindrical right cuff 43R. Cylindrical right cuff 43R and a cylindrical left cuff 43L are each made from a rectangular piece of thin, flexible, fluid-impermeable material. Each rectangular piece of material is rolled into a cylindrical shape. The edges where the material comes together to form a cylinder are then thermally bonded together to form a fluid-impermeable seam. In the preferred embodiment double- polished clear plasticized vinyl is used to make cylindrical right cuff 43R and cylindrical left cuff 43L. However, other thin, flexible, fluid-impermeable materials such as polyethylene, etc., could be used.

In FIG. 1 right side panel 34R contains a hole 42R. Cylindrical right cuff 43R is thermally bonded to right side panel 34R at the edge of hole 42R forming a fluid-impermeable seam. Left side panel 34L contains a hole 42L. Cylindrical left cuff 43L is thermally bonded to left side panel 34L at the edge of hole 42L forming a fluid-impermeable seam.

Tub 32 contains a drain hole 44 in FIG. 4. An extractable drain plug 45 is fit in drain hole 44.

Figure 5:
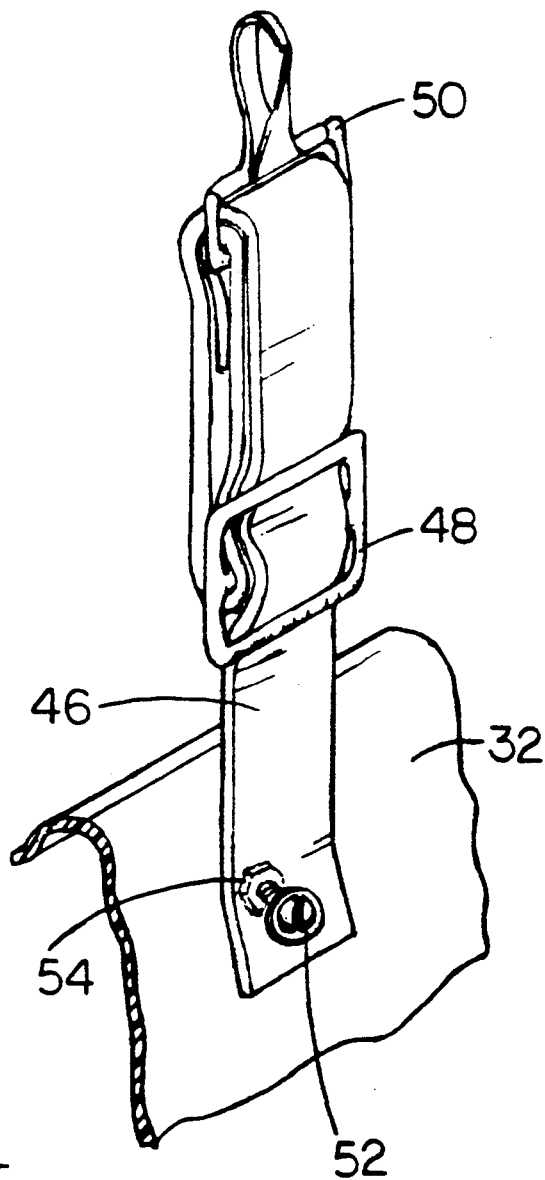
FIG. 5 shows a perspective view of a restraining strap and a restraining strap fixturing device.

In FIG. 5 restraining strap 46 passes through a snap lock 50. Restraining strap 46 is secured around snap lock 50 by sewing the end of restraining strap 46 to itself after passing through snap lock 50. Restraining strap 46 further passes through an adjustable buckle 48.

Restraining strap 46 is affixed to interior front face of tub 32 by a screw 52 and a nut 54 in FIG. 5. In the preferred embodiment, screw 52 and nut 54 consist of nylon. However, screw 52 and nut 54 can consist of any other material that is corrosion resistant, such as polystyrene, polyvinyl chloride, various other plastics, stainless steel, various other metals, etc. In the preferrred embodiment, restraining strap 46 consists of flexible polypropylene webbing material. However, restraining strap 46 can consist of any other material that is moisture resistant and durable, such as nylon, polyester, rubber, treated leather, etc.

In the prefferred embodiment, the size of tub 32 is typically 700 mm long, 600 mm wide and 250 mm deep. The height of the enclosure is typically 750 mm. In other embodiments these dimensions can vary according to the size of the animal intended to be grooomed or washed in apparatus.

Additional embodiments are shown in FIGS. 8, 9, 10, 11, 12, 13.

Figure 8:
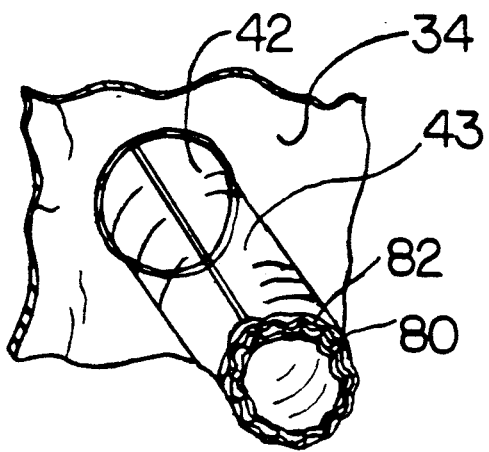
FIG. 8 shows a perspective view of a cuff with an elastic hemmed extremity.

FIG. 8 shows cylindrical cuff 43(R or L) with a cylindrical cuff hem 82 at cuff 43 extremity. A cuff elastic gather 80 is enclosed in cuff hem 82. Cuff elastic gather 80 is made by sewing together the ends of a strip of elastic material in the shape of a ring. Cuff elastic gather 80 is sealed into cuff hem 82 at cuff 43 extremity to form elastic wrist seal.

Figure 9A:
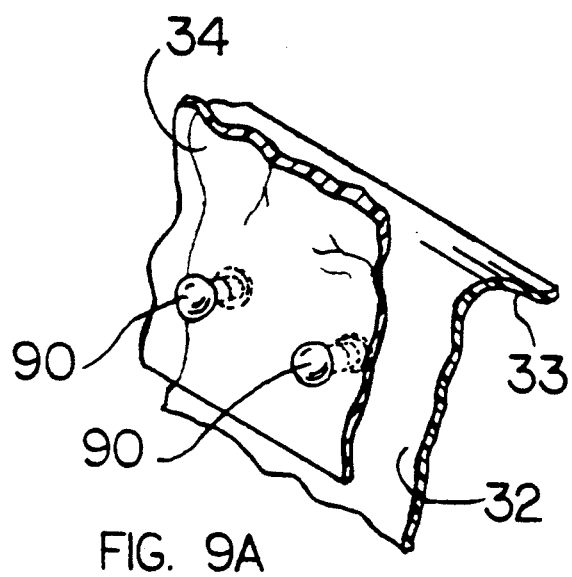
FIGS. 9A to 9D show partial perspective and sectional views of panels which are joined to a tub by rivets, by mechanical fasteners, by liquid adhesive, and by thermal bonding.

FIG. 9A shows panel 34 mechanically fastened to interior of tub 32 by a series of rivets 90. Panel 34 could also be fastened to tub 32 exterior or to tub lip 33 using rivets 90. Other mechanical fasteners, such as nuts and bolts, staples, etc. could be used.

Figure 9B:
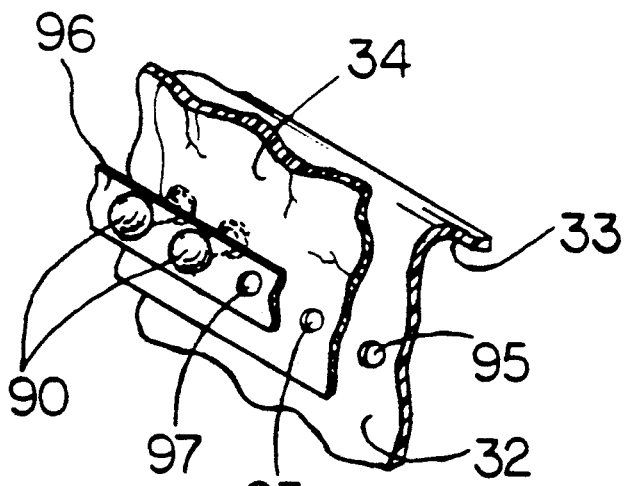

FIG. 9B shows panel 34 mechanically fastened to interior of tub 32 between a strip plate 96 having a plurality of strip plate holes 97. Each strip plate 96 is approximately equal to the length of the side of tub 32 against which it is fastened. Tub 32 has a plurality of tub strip holes 95 and panels 34 have a plurality of panel holes 93 appropriately positioned to coincide with the location of strip plate holes 97. One rivet 90 is inserted through each tub strip hole 95, through each panel hole 93 and each strip plate hole 97 and permanently fastened. Panel 34 is firmly secured to tub 32 by means of strip plate 96 which sandwiches panel securely against tub wall. One strip plate 96 is fastened to each of the four sides of tub 32. FIG. 9B shows strip plate 96 used in tub 32 interior. However, strip plate 96 could also be used along tub lip 33 or on tub 32 exterior, etc. In addition, rivets 90 could be substituted by other appropriate mechanical fasteners such as nuts and bolts, self-tapping screws, etc.

Figure 9C:
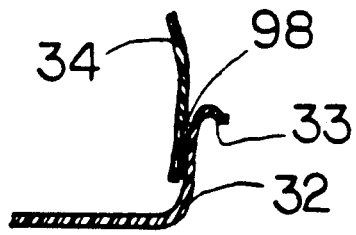

FIG. 9C shows panel 34 bonded to tub 32 interior by virtue of a liquid adhesive 98. However, panel 34 could be bonded to tub lip 33 or to tub 32 exterior by liquid adhesive.

Figure 9D:
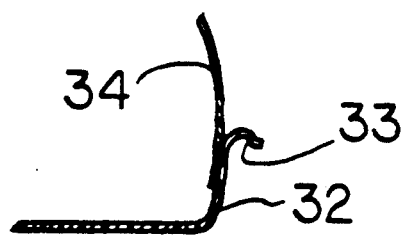

FIG. 9D shows panel 34 thermally bonded to tub 32. Any appropriate means of thermal bonding could be used including simple heat sealing, R.F. welding, etc.

Figure 10:
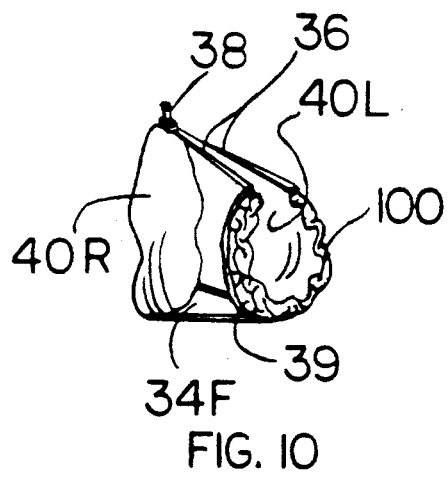
FIGS. 10 shows a partial perspective view of a neck piece with an elastic hemmed extremity.

FIG. 10 shows enclosure neck section having neck piece hem 39 formed by folding over front edge of head opening 70. A head opening elastic gather 100 is sewn into neck piece hem 39. Each end of head opening elastic gather 100 is sewn near edge of neck piece hem 39 where slide fastener sections 36(L and R) are bonded to neck pieces 40 (L and R).

Figure 11:
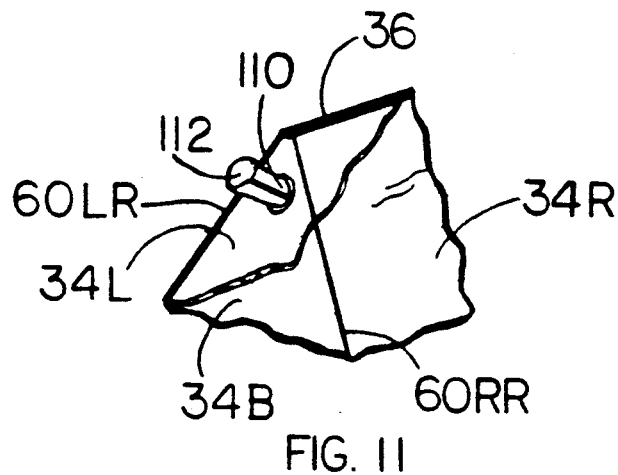
FIG. 11 shows a partial view of an enclosure with a fluid source entry hole and a fluid source entry sleeve.

FIG. 11 shows rear view of apparatus having a fluid source entry hole 110 in back panel 34B. A fluid source entry sleeve 112 is bonded at edges of fluid source entry hole 110 to back panel 34B. Fluid source entry sleeve 112 is formed by rolling a rectangular piece of material into a cylindrical shape and bonding edges together. Fluid source entry sleeve 112 is made of the same material as panels 34.

Figure 12A:
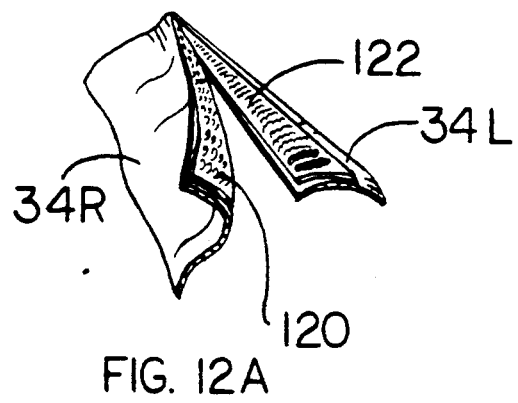
FIGS. 12A and 12B show partial perspective views of various means for closing the dorsal aperture.

FIG. 12A shows view of dorsal aperture having hook and loop fastener to close apparatus dorsal aperture 35. A hook and loop fastener hook section 120 is attached along edge of right side panel 34R and right side neck piece 40R. A hook and loop fastener loop section 122 is attached along edge of left side panel 34L and left side neck piece 40L. Hook and loop fastener sections 120 and 122 are attached by sewing, bonding, etc.

Figure 12B:
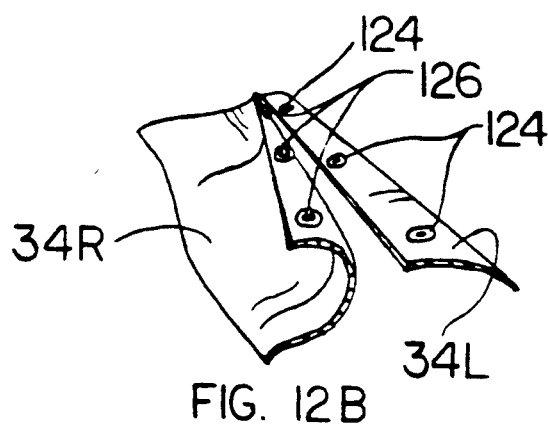

FIG. 12B shows view of dorsal aperture 35 having snaps. A plurality of female snaps 124 are attached to left side panel 34L and left side neck piece 40L along edge. A plurality of male snaps 126 are attached to edge of right side panel 34R and right side neck piece 40R such that the locations of the male snaps 126 coincide with the locations of the female snaps 124 when closing the apparatus dorsal aperture 35. Snaps are attached by sewing, bonding, etc.

Figure 13:
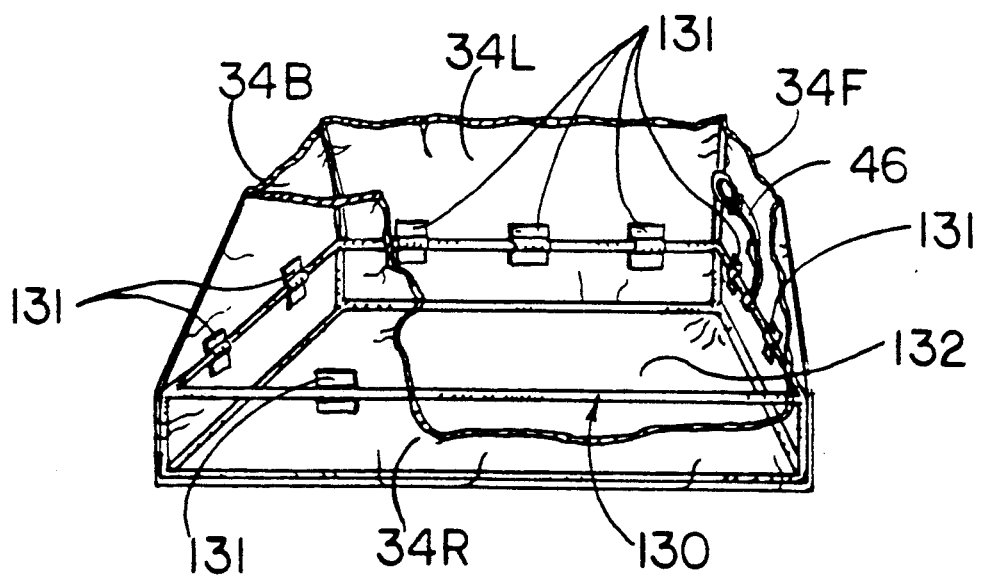
FIG. 13 shows a partial perspective view with portions cut away of an enclosure with a wire base frame.

FIG. 13 shows apparatus having a wire base frame 130 and a bottom 132. Bottom 132 is bonded to front panel 34F, right side panel 34R, back panel 34B, and left side panel 34L. Bottom 132 may be made of the same material as panels 34. Wire base frame 130 is made of heavy guage wire having generally two rectangular portions connected at each corner by a vertical section of straight wire. Wire base frame 130 is pressure fit in the enclosure against bottom 132. A plurality of base frame gusset tabs 131 are bonded to panels 34 such that wire base frame 130 is sandwiched between base frame gusset tabs 131 and panels 34. Lower end of retraining strap 46 is sewn around wire base frame 130 to secure it firmly to wire base frame 130. Adjustment buckle 48 and snap lock 50 are assembled on restraining strap as previously described.

Additional embodiments include using conventional toothed slide fasteners or zippers, or other various clips, straps, ties, etc., to close apparatus dorsal aperture 35 and to adjust head opening 70.

OPERATION OF INVENTION

The manner of using the above invention is described below. In the preferred embodiment, shown in FIG. 1, the dorsal aperture 35 which comprises the slide fastener right section 36R and the slide fastener left section 36L is opened or closed by sliding slider 38 backward or forward, respectively. The dorsal aperture 35 is opened to allow entry of the animal. The animal is lead into the enclosure or lifted into the enclosure. Restraining strap 46 is adjusted by means of adjustment buckle 48 so that snaplock 50 can be clipped to the animal's collar. Restraining strap 46 is tightened to prohibit animal from moving forward or backward. As such, the animal can sit or stand comfortably but cannot move about in the apparatus. The animal is thus restrained within the enclosure. Either prior to or after insertion of animal into the enclosure, appropriate grooming accesssories and products, such as flea control products, dips, shampoos, skin treatment products, brushes, etc. can be put into apparatus through enclosure dorsal aperture. Once the animal has been restrained using restraining strap 46, and any desired grooming accessories have been placed in enclosure, the dorsal aperture 35 is closed by sliding slider 38 forward thereby meshing slide fastener right section 36R with slide faster left section 36L.

Upon closing the apparatus, the user adjusts slider 38 so that head opening 70 fits snuggly but comfortably around animal's neck. Next, neck piece adjustment chord 41 is snugged around animal's neck and tied above animal s neck. In conjunction; the snug fit of head opening 70, the fluid-impermeable construction of the apparatus, and the fluid containment feature of the enclosure prevent fluids from entering animal's eyes or ears during washing or grooming and prevent fluids from escaping beyond the confines of the apparatus. Furthermore, the enclosure restraining feature allows the animal to sit or stand during grooming and prohibits the animal from moving forward or backward, thus preventing the animal from stretching or tearing head opening 70. With the apparatus closed, appropriate fluids and grooming accessories may subsequently be introduced through cuffs 43 and holes 42, if necessary.

Once the animal is secured in the enclosure, the user positions herself behind the animal and inserts hands and arms through cuffs 43 and holes 42. As required, fluids or other grooming products may be applied to animal and massaged into hair and skin. The enclosure provides a transparent barrier between the user and the grooming fluids during the grooming process. While enveloped by the enclosure, the animal's warmth is contained therein. In addition, the enclosure prevents cold air from blowing on the animal. This protection from drafts helps to avoid chilling the animal. The enclosure also assures that the fluids applied to animal remain confined within the enclosure. Soaking an animal in an anti-pest dip, for example flea dip, can also be accomplished with ease. With the animal secured in the apparatus as described above, the user applies dip solution repeatedly to the animal to thoroughly soak its skin and hair. For example, the flea dip solution can be soaked up with a sponge and squeezed out onto the animal repeatedly. Thereafter, the fluids are allowed to remain on the animal for the desired period of time. Tub 32 acts as a reservoir for the washing, grooming, or flea dipping solution during the grooming process. This fluid containment feature thus provides a way of conserving water or fluids by permitting their reuse during grooming. Tub 32 also provides a convenient receptacle in which to measure and mix pest control grooming aids such as flea dips. After mixing is accomplished in tub 32, the mixture is readily accessible for application to animal. Tub 32 also provides a rigid support base upon which the animal may stand or sit without slipping or stumbling.

Transparent panels 34 allow easy sight of animal during use. This permits user to apply fluids to particular body areas or view the animal during grooming or washing.

A fluid source, for example a garden hose, may be inserted into the enclosure through cuffs 43 and holes 42. In this way the user can wet the animal or rinse the animal as desired.

After grooming or washing is finished and the animal has been rinsed, neck piece adjustment chord 41 is untied, snap lock 50 is detached from animal's collar, and slider 38 is pulled back completely whereby dorsal aperture 35 is opened. The animal is allowed to exit and may be dried or allowed to dry naturally. Thereafter, fluid contents in tub 32 may be drained conveniently in a location of choice. To do this, the enclosure is carried to any desired drainage location and drain plug 45 is extracted from drain hole 44 to allow the fluid contents to exit enclosure. Any animal hair, dirt, etc. will also be conveniently disposed of at the time of draining fluid contents. By using the enclosure as described and then selecting the appropriate drainage location out of doors, the user can eliminate the problem of animal hair and dirt plugging house drains such as bath tub drains or sink drains. The problem of clogged drains is typical for anyone using their home sink or bath tub as a grooming or washing location.

The use of further embodiments of the invention are described below.

The embodiment shown in FIG. 8 provides cuffs 43 with cuff elastic gathers 80. Cuffs 43 and cuff elastic gathers 80 form a fluid-resistant seal at the user's wrist providing a fluid-resistant barrier between the users arms and the animal being groomed or washed. This feature allows user to insert hands and arms into enclosure and maintain arms dry during washing and grooming.

The embodiment shown in FIG. 10 provides head opening elastic gather 100 which adjusts snuggly around the animal's neck upon closing apparatus dorsal aperture 35.

The embodiment shown in FIG. 11 shows an enclosure with fluid source entry hole 110 and fluid source entry sleeve 112. The user may insert a hose or other appropriate fluid source through fluid source entry hole 110 to wet animal prior to washing or to rinse animal after washing.

The embodiments shown in FIGS. 12A and 12B provide various mechanical fastening means for closing apparatus dorsal aperture 35. The use of the enclosure is as previously described with the exception that instead of using slide fastener sections 36 and slider 38 to seal apparatus dorsal aperture 35, the described mechanical fasteners close dorsal aperture 35. In FIG. 12A hook and loop fasteners are used. The animal is placed in enclosure and then hook and loop fastener hook section 120 and hook and loop fastener loop section 122 are pressed together along their length to close dorsal aperture 35. Similarly, in FIG. 12B male snaps 126 are pressed into female snaps 124 to close dorsal aperture 35 after placing animal in enclosure.

The embodiment shown in FIG. 13 shows an enclosure with wire base frame 130 and base frame gusset tabs 131. The enclosure is used as described previously with the precaution that the user place the enclosure on a rigid surface, such as cement, wood, linoleum, etc. to provide a rigid support for the animal's weight.

CONCLUSION, RAMIFICATIONS, AND SCOPE

Accordingly, the reader will see that the pet washing and grooming apparatus of this invention provides a portable and economical pet grooming device which allows user to remain dry while conveniently washing or grooming his pet. Furthermore, the apparatus has the additional advantages in that;

it maintains the washing fluids within its confines thus eliminating fluids from splattering and making a mess of the grooming area;

it provides a means for containing the grooming or washing fluids and thus for conserving water;

it is inexpensive to manufacture;

it provides a tub which permits measuring and mixing of anti-pest grooming products, as well as being a convenient receptacle for warm water for washing;

it provides a tub which offers rigid support for the animal and prevents pet from slipping or stumbling;

it provides a barrier to wind and cold air which would otherwise chill animal during grooming;

it provides an insulation layer which contains animal's body heat within enclosure thus increasing the pet's comfort while wet;

it provides a restraining strap which prohibits animal from moving forward or backward in apparatus while still allowing the pet to sit or stand at will;

it provides a convenient location for pest control products, such as flea dips, to soak on the animal while maintaining the animal's general comfort;

it provides an adjustable head opening which allows animal's head to protrude to the outside of enclosure, thus eliminating the possibility of grooming fluids entering the animal's eyes or ears;

it provides fluid-impermeable clear panels which allow easy viewing of animal during grooming;

it provides arm holes and cuffs which allow easy entry and removal of grooming products and tools even after the animal is in the apparatus and the dorsal aperture is closed;

it provides arm holes and cuffs that allow easy access to all parts of animal's body within the enclosure; and it provides a simple drain hole and drain plug which allow user to select any appropriate location for disposal of soiled grooming fluid.

Although the description above contains many specificities, these should not be construed as limiting the scope of the invention but as merely providing illustrations of some of the presently preferred embodiments of the invention. For example, the apparatus could have other similar configurations, materials cited could be slightly modified, etc.

Thus the scope of the invention should be determined by the appended claims and their legal equivalents, rather than by the examples given.

I claim:

1. A pet washing and grooming apparatus comprising:

an enclosure having an upper casing of transparent flexible fluid impermeable material, said upper casing having a dorsal aperture for entry of an animal into said enclosure, said upper casing having a head opening through which the head of said animal can extend, said upper casing further comprising: closure means extending along dorsal aperture to head opening for closing said dorsal aperture to prevent washing or grooming fluids from exiting said enclosure;

a bottom of fluid impermeable material permanently bonded to said upper casing in a manner whereby said upper casing covers said bottom and extends a distance above said bottom and whereby bond between said bottom and said upper casing forms a substantially fluid impermeable seal between said upper casing and said bottom;

a wire base frame fit snuggly inside said enclosure upon said bottom and against lower portion of said upper casing;

a plurality of base frame gusset tabs bonded to said upper casing with said wire base frame sandwiched between said base frame gusset tabs and said upper casing;

at least one hole formed through said upper casing; and a flexible fluid impermeable cuff extending from said upper casing at each of said holes for permitting the user access to said animal within said enclosure, whereby the user can conveniently wash or groom said animal while remaining dry and washing fluids within said enclosure are prevented from leaking therefrom.

2. The apparatus of claim 1, further including an adjustable restraining means permanently affixed to said wire base frame, whereby said animal within said enclosure is prevented from stretching or tearing said head opening by struggling but is allowed to comfortably sit or stand while being washed or groomed.

3. The apparatus of claim 1, further including a head opening adjustment means at head opening extremity for embracing the neck of said animal in a substantially fluid impermeable manner.

4. The apparatus of claim 3, wherein said head opening adjustment means include an elastic gather permanently affixed to said head opening extremity which expands or contracts to seal around the neck of said animal.

5. The apparatus of claim 3, wherein said head opening adjustment means include a neck piece adjustment chord for adjustably cinching head opening around the neck of said animal.

6. The apparatus of claim 1, further including a fluid source entry hole and a fluid source entry sleeve in said upper casing, whereby the user may enter a fluid source, such as a hose, into said enclosure.

7. A portable pet washing and grooming apparatus for washing or grooming a pet without wetting the area in which the apparatus is located, said apparatus comprising:

an enclosure having substantially rigid tub of fluid impermeable material;

an upper casing of transparent flexible fluid impermeable material, said upper casing having a dorsal aperture for entry of an animal into said enclosure, said upper casing having a head opening through which the head of an animal can extend, said upper casing further comprising: closure means extending along dorsal aperture to head opening for closing said dorsal aperture to prevent washing or grooming fluids from exiting said enclosure;

a fastening means for permanently affixing said upper casing to said tub in a manner whereby said upper casing covers said tub and extends a distance above said tub and said fastening means forms a substantially fluid impermeable seal between said upper casing and said tub;

two holes formed through said upper casing; and a pair of plastic cuffs each protruding into said enclosure from a corresponding one of said holes, each of said plastic cuffs having a cuff elastic gather enclosed in a cuff hem, whereby said cuff elastic gather and said cuff hem form a substantially fluid impermeable seal at the user's wrist and said cuff forms a fluid impermeable barrier between the user's arm and said pet being washed or groomed, further including an adjustable restraining means permanently affixed to said tub, said adjustable restraining means comprising; a restraining strap, an adjustment buckle and a snap lock, whereby clipping said snap lock to said animal's collar and tightening said restraining strap by adjusting said adjustment buckle, said animal within said enclosure is restrained and prevented from stretching or tearing said head opening by struggling but is allowed to comfortably sit or stand while being washed or groomed.

8. The apparatus of claim 7, wherein said fastening means for permanently affixing said upper casing to said tub include double sided adhesive tape.

9. The apparatus of claim 8, wherein said tub has a tub lip, said tub lip has an undersurface and wherein said double sided adhesive tape is permanently bonded to undersurface of said tub lip and said upper casing is permanently bonded to said double sided adhesive tape, whereby the bonding strength of said double sided adhesive tape is evenly distributed around said tub at said tub lip and whereby the fit of said upper casing around said tub lip substantially precludes peeling and renders a tear resistant, high strength permanent bond between said tub, said double sided tape, and said upper casing.

10. The apparatus of claim 7, wherein said head opening comprises: a front panel, a right side neck piece, a left side neck piece, a slide fastener right section and a slide fastener left section, whereby said head opening surrounds the neck of said animal within said apparatus upon closing said dorsal aperture, and whereby a substantially fluid impermeable seal is created between said head opening and said animal's neck by virtue of conical shape of head opening upon closing said dorsal aperture.

11. A portable pet washing and grooming apparatus comprising:

an enclosure having a substantially rigid tub of fluid impermeable material;

an upper casing of transparent flexible fluid impermeable material, said upper casing having a dorsal aperture for entry of an animal into said enclosure, said upper casing having a head opening through which the head of an animal can extend, said upper casing further comprising: closure means extending along dorsal aperture to head opening for closing said dorsal aperture to prevent washing or grooming fluids from exiting said enclosure;

a fastening means for permanently affixing said upper casing to said tub in a manner whereby said upper casing covers said tub and extends a distance above said tub and said fastening means forms a substantially fluid impermeable seal between said upper casing and said tube;

two holes formed through said upper casing;

a flexible fluid impermeable cuff protruding into said enclosure from each corresponding hole for permitting the user access to said animal within said enclosure; and an adjustable restraining means permanently affixed to said tub comprising: a restraining strap, an adjustment buckle and a snap lock, whereby clipping said snap lock to said animal's collar and tightening said restraining strap by adjusting said adjustment buckle, said animal within said enclosure is restrained and prevented from stretching or tearing said head opening by struggling but is allowed to comfortably sit or stand while being washed or groomed.

12. The apparatus of claim 11, wherein said fastening means for permanently affixing said upper casing to said tub include double sided adhesive tape.

13. The apparatus of claim 12, wherein said tub has a tub lip, said tub lip has an undersurface and wherein said double sided adhesive tape is permanently bonded to undersurface of said tub lip and said upper casing is permanently bonded to said double sided adhesive tape, whereby the bonding strength of said double sided adhesive tape is evenly distributed around said tub at said tub lip and whereby the fit of said upper casing around said tub lip substantially precludes peeling and renders a tear resistant, high strength permanent bond between said tub, said double sided tape, and said upper casing.

14. The apparatus of claim 11, wherein said head opening comprises a front panel, a right side neck piece, a left side neck piece, a slide fastener right section and a slide fastener left section, whereby said head opening surrounds the neck of said animal within said apparatus upon closing said dorsal aperture, and whereby a substantially fluid impermeable seal is created between said head opening and said animal's neck by virtue of conical shape of head opening upon closing said dorsal aperture.

* * * * *